Aug. 29, 1961     B. M. GORDON ET AL     2,998,595

DATA INTERPRETATION SYSTEM

Filed April 7, 1958

INVENTORS
ROBERT P. TALAMBIRAS
BERNARD M. GORDON

BY Joseph Weingarten

ATTORNEY

2,998,595
DATA INTERPRETATION SYSTEM

Bernard M. Gordon, Newton, and Robert P. Talambiras, Boston, Mass., assignors to Epsco, Incorporated, Boston, Mass., a corporation of Massachusetts
Filed Apr. 7, 1958, Ser. No. 726,766
5 Claims. (Cl. 340—174.1)

The present invention relates in general to telemetering and more particularly concerns a system for recovering telemetered data from recorded frequency modulated subcarrier signals despite frequency variations due to wow and flutter in the recording system. The novel system is capable of simultaneously providing output signals characteristic of the deviation from center frequency of a number of closely-spaced subcarrier signals with an exceptionally high degree of accuracy.

In a telemetering system, certain parameters, for example, strain and temperature, are converted into electrical signals by suitable transducers, such as strain gauges and thermocouples. When there are a number of parameters to be remotely monitored and space and weight are at a premium, such as in a missile under flight test, the signals from the transducers modulate respective subcarriers continuously, or on a time-sharing basis. The subcarriers modulate a carrier signal for transmitting the data to a remote data processing station. There, the carrier and subcarriers are demodulated to derive information bearing signals. While these signals are frequently processed directly, there are many instances where it is desired to record them before processing. For example, when the data is to be processed in a digital computer, the demodulated signals in analog form must first be digitized. The digitized signals are then supplied to the internal storage of the digital computer for processing.

When the subcarrier signals are time-modulated; that is to say, the information is conveyed by modulating a signal parameter characterized by the timing of signal occurrences, the wow and flutter of the recording system introduce unwanted modulation, seriously detracting from system accuracy. Some types of time modulation adversely affected in this manner include frequency modulation, phase modulation, pulse duration modulation, and pulse position modulation.

The present invention contemplates and has as a primary object compensating for errors introduced by the wow and flutter of a recording system storing time-modulated subcarriers.

It is another object of the invention to achieve the preceding object with apparatus separately providing accurate indications of time-modulated data on a number of closely-spaced subcarrier signals.

Still another object of the invention is to provide accurate flutter and wow correctional signals despite variations in delay imparted by bandpass filters selectively providing the separated subcarriers.

According to the invention, a fixed frequency signal is recorded simultaneously with the time-modulated subcarriers. The frequency variations of the recorded fixed frequency signal are due to wow and flutter in the recording system. When the recorded time-modulated signals are read out of the recording system, a correctional signal is derived in response to these variations and combined with a recorded subcarrier signal to yield an output signal characteristic of the time modulation of the respective subcarrier signal prior to being recorded.

More specifically, output current pulses are provided having an average value related to the time modulation of the recorded subcarrier signal with wow and flutter components appreciably reduced in response to the correctional signal. These pulses are applied to a low pass filter which provides an output potential characteristic of the aforesaid average value.

Other features, objects and advantages of the invention will become apparent from the following specification when read in connection with the accompanying drawing in which.

Figure 1:
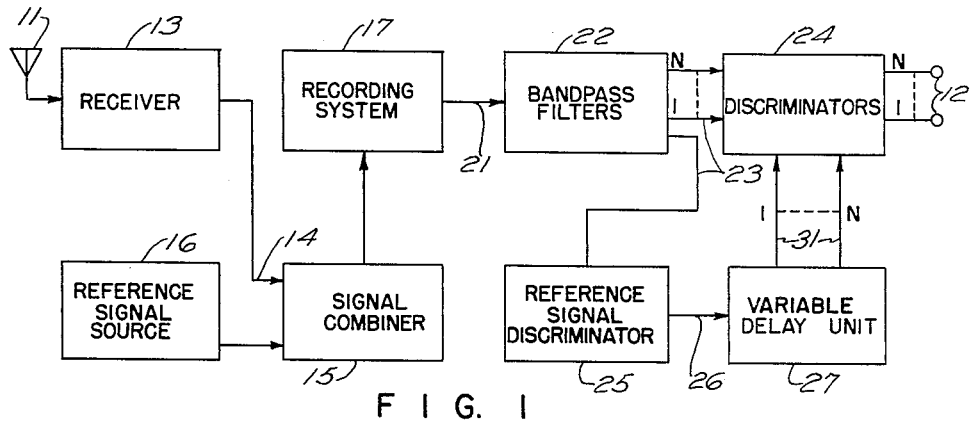
FIG. 1 is a block diagram of a ground station for receiving telemetered data.

With reference now to the drawing and more particularly FIG. 1 thereof, there is illustrated a block diagram of a ground telemetry station for receiving, recording and demodulating frequency modulated subcarrier signals. The carrier signal with the modulated subcarriers is received by an antenna 11 and potentials characteristic of the data frequency modulated on the respective subcarriers are separately provided on the $n$ output terminals 12, there being one such terminal for each of the $n$ subcarriers. Receiver 13 demodulates the carrier signal to provide a composite signal on output line 14 including the $n$ frequency modulated subcarrier signals for application to signal combiner 15. A fixed frequency reference signal from reference signal source 16 is also applied to signal combiner 15 to provide a composite signal including the reference signal and all the subcarrier signals for simultaneous recording in recording system 17.

The recorded composite signal is recovered from recording system 17 and is provided on line 21 to band pass filters 22. However, the frequencies are altered by a factor which may be arbitrarily designated as $(1+e)$ due to the wow and flutter of the recording system, $e$ being the fractional change in relative velocity between the recording medium and the recording transducer. The recorded subcarrier and reference signals are separately provided on output lines 23. The frequency of each separately provided subcarrier signal is sensed by respective discriminators 24. The separately provided recorded reference signal is applied to reference signal discriminator 25 to provide a correctional signal on line 26. The correctional signal is applied to variable delay unit 27 for delay by respective increments corresponding to the delay imparted to each recorded subcarrier signal by an associated one of band pass filters 22. A corresponding one of the delayed correctional signals is applied on lines 31 to respective ones of discriminators 24 for multiplicative and additive combination therein to compensate for the wow and flutter factor, $(1+e)$, neglecting second order errors. That is, the corrected signal is actually proportional to $(1+e^2)$, but this second order error is negligible in practical cases where $e$ typically is of the order of 3 percent or less.

Figure 2:
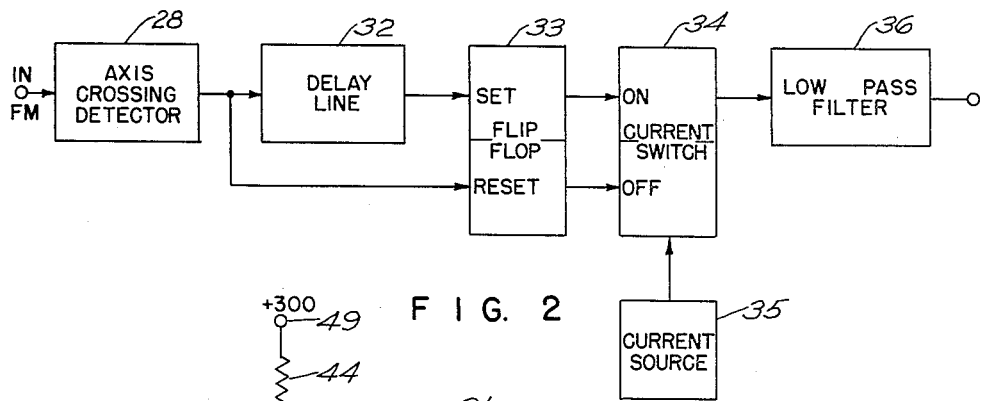
FIG. 2 is a block diagram of a preferred frequency discriminator.

With reference to FIG. 2, there is illustrated a block diagram of a representative one of discriminators 24 and reference signal discriminator 25. For operating details of this type of discriminator, reference is made to the copending applications of Bernard M. Gordon, entitled Frequency Detecting Unit, Serial No. 584,802, filed May 14, 1956, now abandoned, and Frink M. Young, Bernard M. Gordon and Sherman Rigby, entitled Frequency Discriminator, Serial No. 634,634, filed January 17, 1957, now Patent No. 2,961,611. This consists of axis crossing detector 28, a precision delay line 32, a flip-flop 33, whose state is governed by signals applied directly from the axis crossing detector 28 and by the same signals after emersion from delay line 32. In operation, one axis crossing per cycle is used with the delay being about 80% of the period of the reference signal frequency for discriminator 25 and 90% of the period of a subcarrier upper limit frequency for a discriminator 24 when wow and flutter are zero. Consequently, once during each input cycle, the flip-flop is reset by the occurrence of an axis crossing pulse, the latter after the appropriate delay also serving to set the flip-flop. Assuming a fixed output voltage level for flip-flop 33, the rectangular wave thus obtained, averaged over one cycle, is directly proportional to $(1-Tf)$ where $T$ is the delay of delay line 32 and $f$ is the instantaneous frequency, including wow and flutter. For continuous indication, the output is averaged or integrated, over several cycles, the length of integration being chosen long enough to yield a desired accuracy, yet short enough so that the integrated voltage is indicative of frequency deviations.

The flip-flop 33 rectangular wave is used to actuate current switch 34 which functions to pass a current of carefully controlled magnitude from current source 35 to low pass filter 36, serving as the integrating circuit. When the discriminator of FIG. 2 is used as the reference signal discriminator, the current source is arranged to furnish a current having a constant amplitude.

Where the discriminator of FIG. 2 is employed as a discriminator 24, signal from a respective one of lines 31 (FIG. 1) of the variable delay unit 27 is applied to control the magnitude of the switched current source 35 to control the magnitude of the switched current. The magnitude of this current decreases in response to an increase in frequency due to wow and flutter while its duration decreases. At the same time the correctional signal effectively adds a D.-C. component to the current pulse train whereby the average value of the composite signal is nearly independent of wow and flutter. Since the voltage output from low pass filter 36 is proportional to this average value, it follows that the output voltage on terminal 12 is essentially independent of wow and flutter except for second order effects.

This will be better understood from the following analysis. The output voltage from a discriminator 24 is given by:

$$E_{out} = Z_n I_n [1 - T_n f_n (1+e)]$$

where $I_n$ is the instantaneous current from current source 35, $f_n$ is the instantaneous frequency of the $n$th subcarrier, $T_n$ is the delay of delay line 32 for the corresponding channel, $Z_n$ is the magnitude of the transfer impedance of low pass filter 36 and $e$ is the fractional frequency deviation due to wow and flutter.

The voltage from reference signal discriminator 25 is $$E_r = Z_r I_r [1 - T_r f_r (1+e)]$$

where the symbols represent the parameters enumerated above, but associated with reference signal discriminator 25. The behavior of the current $I_n$ from the current source 35 is given mathematically by $$I_n = K_n E_r + I_{no}$$

where $I_{no}$ is the current from the current source when no wow and flutter is present, and $K_n E_r$ is the current from the current source due to the wow and flutter.

$$E_{out} = Z_n \{K_n Z_r I_r [1 - T_r f_r (1+e)] + I_{no}\}\{1 - T_n f_a (1+e)\}$$

$$\frac{E_{out}}{Z_n} = K_n Z_r I_r [1 - T_r f_r (1+e)]$$

$$- K_n Z_r I_r T_n f_n (1+e)[1 - T_r f_r (1+e)]$$

$$+ I_{no} - I_{no} T_n f_n (1+e)$$

Neglecting second order terms of $e$, if $$-K_n Z_r I_r T_r f_r e - K_n Z_r I_r T_n f_n e + 2 K_n Z_r I_r T_n f_n T_r f_r e$$
$$- I_{no} T_n f_n e = 0$$

$E_{out}$ is independent of wow and flutter. All terms which include $T_n f_n$ are set equal to zero to make $e$ independent of $f_n$, leaving $$K_n Z_r I_r - K_n Z_r I_r T_r f_r + I_{no} = 0$$

$$K_n Z_r I_r (1 - T_r f_r) + I_{no} = 0$$

To eliminate the effect of the remaining term, a term $K_a e$ is added.

$$K_a e = K_n Z_r I_r T_r f_r e$$

From the expression for $E_r$, $$E_r = Z_r I_r - Z_r I_r T_r f_r - Z_r I_r T_r f_r e$$

$$Z_r I_r T_r f_r e = Z_r I_r (1 - T_r f_r) - E_r$$

$$\boxed{K_a e = K_n Z_r I_r (1 - T_r f_r) - K_n E_r}$$

The expression for $E_{out}$ with the additional additive term then becomes:

$$E_{out} = Z_n \{K_n Z_r I_r [1 - T_r f_r (1+e)] + I_{no}\}\{1 - T_n f_n (1+e)\} + K_n Z_n Z_r I_r (1 - T_r f_r) - K_n Z_n E_r \quad (1)$$

Figure 3:
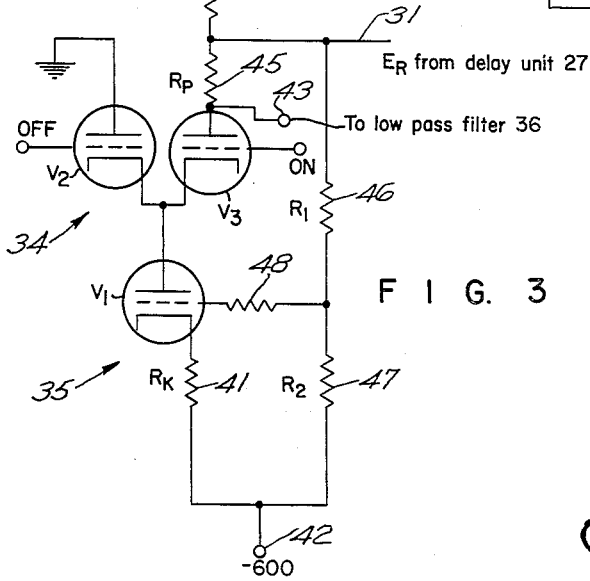
FIG. 3 is a schematic circuit diagram of portions of the block diagram of FIG. 2 showing how the correctional signal may be introduced.

This equation defines conditions for eliminating first order effects of wow and flutter. A circuit for instrumenting these conditions is shown in FIG. 3. Before explaining the techniques for choosing circuit parameters, operation will be described generally.

With reference to FIG. 3, there is illustrated a schematic circuit diagram showing the current source 35 and the current switch 34 used in the discriminator 24. When the discriminator of FIG. 2 is employed as the reference signal discriminator 25, the current source and current switch circuit arrangement is simpler than the circuitry of FIG. 3 as the current source then need only furnish a current of constant amplitude. When the discriminator of FIG. 2 is used as a discriminator 24, however, the correctional signal, $E_r$, is coupled by line 31 to that discriminator to control the magnitude of the switched current pulses. Current source 35 comprises tube V1 having a relatively large cathode resistor 41 connected to a relatively high negative potential on terminal 42. Current switch 34 comprises tubes V2 and V3. When flip-flop 33 (FIG. 2) is in the reset condition, current switch 34 is Off, and the grids of tubes V2 and V3 are high and low, respectively. Therefore, tubes V2 and V3 are respectively conducting and non-conducting. Consequently, no electron tube current flows at output terminal 43. However, there is a component of current due to the potential on terminal 49 causing current to flow through resistors 44 and 45 and due to the correctional signal, $E_r$, causing a current to flow through resistor 45.

When switch 34 is On, conditions are reversed and conducting tube V3 directs a current controlled by current source 35 to output terminal 43 for integration by low pass filter 36. The correctional signal, $E_r$, which appears on output line 31 of the variable delay unit, is coupled to the grid of tube V1 by a precision attenuating network formed of resistors 46 and 47, with a low value resistor 48 isolating the grid from the junction of the attenuator resistors 46 and 47. Thus, when the frequency is increased due to wow and flutter, the potential on the grid of tube V1 falls, causing a decrease in the tube current amplitude. At the same time, the incremental increase in frequency of the associated subcarrier signal causes a corresponding decrease in the duration of the current pulses.

Thus, the area of each current pulse is reduced in response to an increase in $e$, causing a corresponding decrease in the output signal $E_{out}$ and tending to produce an output indication reflecting the wow and flutter component, an apparently undesirable effect. However, it has the desirable effect of causing an area change which is a function only of $e$, independently of the instantaneous frequency $f_n$ of the subcarrier. This occurs because the pulse width is proportional to the $e$ component in the frequency of the recorded subcarrier while its amplitude is proportional to the $e$ component in the recorded reference signal. By adding the component functionally related to $-K_nE_r$, a D.-C. current is added to the current pulses of a sense opposite to the incremental change in average current resulting from area changes caused by wow and flutter, but of nearly equal magnitude.

To select appropriate parameter values for the circuit of of FIG. 3, it is convenient to refer potentials to terminal 43. Designating the current flow through tube V3 when conducting, $i_p$, and the resistance values of the various resistors as indicated in FIG. 3, the average value of current flowing out from terminal 43 is $$\frac{E_r}{R_p} + i_v[1 - T_n f_n(1+e)]$$

Since $R_k$ is very large, tube V1 operates as a cathode follower having substantially unity gain and $$i_v = \frac{R_2}{R_1 + R_2} \frac{E_r + 600}{R_k}$$

that is, the potential on the grid of tube V1 divided by the value $R_k$ of cathode resistor 41.

By matching terms with those in Equation 1, the parameter values may be selected. First, it is appropriate to note that the additive term in Equation 1

$$K_n Z_n Z_r I_r (1 - T_r f_r)$$

corresponds to $E_r$ for $e=0$. When $e=0$, no additive term is required and $$K_n Z_n Z_r I_r (1 - T_r f_r) - K_n Z_n E_r(0) = 0$$

To effect this condition for $e=0$, $$\frac{E_r}{R_p}$$

must then be zero.

Thus, $E_r(0) = 0$.

This leads to the relation that $$K_n = \frac{1}{R_p}$$

When $e=0$ and $E_r=0$, the term $K_n Z_r I_r (1 - T_r f_r) + I_{no}$ becomes equal to $i_p$, or $$\frac{R_2}{R_1 + R_2} \frac{600}{R_k}$$

Since $$K_n Z_r I_r (1 - T_r f_r) = I_{no}$$

$$i_p = \frac{2Z_r I_r}{R_p}(1 - T_r f_r)$$

Thus, $R_1$, $R_2$, $R_k$ and the potential on terminal 42 are selected to establish $I_p$ appropriately. Resistor 44 is chosen to have a value such that the positive potential on terminal 49 biases line 31 so that it is at zero potential relative to terminal 43 for the selected values of $Z_n$ and $I_r Z_r$ for zero error.

With this method of frequency compensation, all the advantages achieved by the discriminators disclosed in the aforesaid copending applications may be obtained by detect recorded time-modulated signals while reducing the deleterious effects of the recording system wow and flutter.

The particular method by which the subcarriers are modulated on the carrier are not important to the invention and may be by frequency, phase or amplitude modulation. The recording system may, for example, be a magnetic tape or magnetic drum recording system. The band pass filters may be lumped parameter, crystal or mechanical band pass filters. The signal combiner 15 may be any linear combining means such as a resistive adder or the signals might be applied to the recording medium through separate recording heads. The variable delay unit may be, for example, a conventional tapped delay line having lumped or distributed parameters and arranged to delay the correctional signal by time intervals corresponding to the delay introduced by the respective band pass filters.

It is evident that those skilled in the art may make numerous other modifications of and departures from the specific embodiments described herein without departing from the inventive concepts. Consequently, the invention is to be construed as limited only by the spirit and scope of the appended claims.

What is claimed is:

1. Selective signalling apparatus comprising, sources of a fixed frequency signal and a frequency modulated signal, means for recording said fixed frequency signal and said frequency modulated signal on the same recording medium, frequency selective means responsive to the recorded signals for separately providing the recorded fixed frequency signal and the recorded frequency modulated signal, said frequency selective means imparting different delays to said recorded signals, delay means for imparting to the signal applied to its input a delay equal to the difference in delay between said recorded signals, first frequency sensitive means responsive to said separately provided recorded fixed frequency signal for providing a correctional signal characteristic of variations in said fixed frequency due to the recording process, means for applying said correctional signal to said delay means to provide a delayed correctional signal, second frequency sensitive means responsive to said separately provided recorded frequency modulated signal for providing output pulses having a duration related to the instantaneous frequency of said recorded frequency modulated signal including variations due to the recording process, first compensating means responsive to said correctional signal for controlling the amplitude of said pulses whereby changes in pulse area due to said variations is independent of said instantaneous frequency, and second compensating means responsive to said correctional signal for altering the average level of said output pulses whereby said average level is nearly independent of said variations.

2. Apparatus in accordance with claim 1 wherein each of said first and second frequency sensitive means comprises, an axis crossing detector for providing pulses spaced in time in accordance with the instantaneous frequency of an applied input signal, means for delaying each of said pulses by a fixed time interval less than the time interval between consecutive ones of said time spaced pulses, and means responsive to said time spaced pulses and said delayed pulses for providing said output pulses.

3. Selective signalling apparatus comprising sources of a fixed frequency signal and a plurality of frequency modulated signals, means for recording said fixed frequency signal and said frequency modulated signals on the same recording medium, frequency selective means responsive to the recorded signals for separately providing the recorded fixed frequency signal and the recorded frequency modulated signals, said frequency selective means imparting different delays to said recorded signals, first frequency sensitive means providing an output correctional signal equal to a term proportional to the instantaneous frequency of said recorded fixed frequency signal subtracted from a constant, said correctional signal being characteristic of wow and flutter introduced in the recording process, means for delaying said correctional signal by increments corresponding to the difference in delay imparted to said recorded frequency modulated signals relative to the delay imparted to said recorded fixed frequency signal to provide a delayed correctional signal for each separately provided frequency modulated signal, respective second frequency sensitive means responsive to an associated one of said separately provided frequency modulated signals and providing current pulses of controlled amplitude and having durations proportional to the instantaneous frequency of said associated signal, means for applying the associated one of said delayed correctional signals to each of said second frequency sensitive means to establish said controlled amplitude and an additional direct current component both proportional to said associated delayed correctional signal, whereby the combined average value of said current pulses and said additional direct current component is nearly independent of said wow and flutter.

4. Apparatus in accordance with claim 3 wherein each of said second frequency sensitive means comprises, an axis crossing detector for providing axis crossing pulses spaced in time in accordance with the instantaneous frequency of an associated separately provided frequency modulated signal, means for delaying each of said axis crossing pulses by a fixed time interval less than the time interval between consecutive ones of said time-spaced pulses, an output terminal, a current source emitting a current of said controlled amplitude, a current switch responsive to each of said delayed pulses and said axis crossing pulses for starting and interrupting respectively the flow of said current to said output terminal to provide said current pulses, a resistor connected to said output terminal, and means for coupling said delayed correctional signal to said current source to establish said controlled amplitude and to said output terminal through said resistor to establish said additional direct current component.

5. In a device for compensating for undesired frequency variations in a frequency modulated information signal which is accompanied by a nominally fixed frequency reference signal exhibiting frequency variations corresponding to the undesired frequency variations, the combination of: frequency selective filters responsive to said information and reference signals for providing said information and reference signals at separate outputs, said filters causing said signals to be delayed in transmission therethrough in accordance with the frequency of said signals, a first discriminator having said delayed reference signal coupled to its input, said first discriminator demodulating said reference signal to derive a correctional signal, a delay unit coupled to the output of said first discriminator for delaying said correctional signal for a time equal to the difference in delays between said information signal and said reference signal caused by said filters, means responsive to said delayed information signal for generating voltage pulses having a duration related to the instantaneous frequency of said information signal, a switch controlled by said pulses, a current source and an integrating mechanism connected through said switch, and means responsive to the correctional signal output of said delay unit for controlling the amplitude of current available from said source.

References Cited in the file of this patent

UNITED STATES PATENTS

| | | |
|---|---|---|
| 2,364,723 | Kellogg | Dec. 12, 1944 |
| 2,668,283 | Mullin | Feb. 2, 1954 |
| 2,685,079 | Hoeppner | July 27, 1954 |
| 2,713,677 | Scott et al. | July 19, 1955 |
| 2,714,202 | Downing | July 26, 1955 |
| 2,807,797 | Shoemaker | Sept. 24, 1957 |
| 2,812,510 | Schultz | Nov. 5, 1957 |
| 2,827,622 | Guttwein | Mar. 18, 1958 |
| 2,828,478 | Johnson | Mar. 25, 1958 |
| 2,840,800 | Chester | June 24, 1958 |